United States Patent [19]

Takahashi et al.

[11] Patent Number: 5,189,284

[45] Date of Patent: * Feb. 23, 1993

[54] RESISTOR, PROCESS FOR PRODUCING THE SAME, AND THERMAL HEAD USING THE SAME

[75] Inventors: Kumiko Takahashi; Kazuo Baba; Yoshiyuki Shiratsuki, all of Kanagawa, Japan

[73] Assignee: Fuji Xerox Co., Ltd., Tokyo, Japan

[ * ] Notice: The portion of the term of this patent subsequent to Oct. 1, 2008 has been disclaimed.

[21] Appl. No.: 315,665

[22] Filed: Feb. 27, 1989

[30] Foreign Application Priority Data

Feb. 29, 1988 [JP] Japan .................................. 46406/88

[51] Int. Cl.⁵ ....................... H05B 3/16; G01D 15/10; H01C 1/012; B05D 3/02
[52] U.S. Cl. ..................................... 219/543; 219/216; 346/76 PH; 338/308; 427/226; 427/126.5; 427/126.1
[58] Field of Search ................... 219/543, 216; 29/611; 338/306–309; 346/76 PH; 252/514, 518; 427/226, 126.5, 126.1

[56] References Cited

U.S. PATENT DOCUMENTS

| | | | |
|---|---|---|---|
| 3,629,781 | 12/1971 | Helgeland | 338/276 |
| 3,681,261 | 8/1972 | Mason | 252/514 |
| 3,816,097 | 6/1974 | Daiga | 75/.5 A |
| 3,865,742 | 2/1975 | Greenstein | 252/63.5 |
| 3,876,560 | 4/1975 | Kuo | 338/308 |
| 4,296,309 | 10/1981 | Shinmi | 219/543 |
| 4,574,292 | 3/1986 | Takikawa | 219/543 |

Primary Examiner—Bruce A. Reynolds
Assistant Examiner—Michael Switzer
Attorney, Agent, or Firm—Finnegan, Henderson, Farabow, Garrett and Dunner

[57] ABSTRACT

A resistor comprises iridium and at least one metal selected from the group consisting of silicon, bismuth, lead, tin, aluminum, boron, titanium, zirconium, calcium and barium. A process for producing the resistor comprises the steps of coating a solution of an iridium containing organometallic material onto a substrate and subsequently firing the coated solution. The resistor is used as a heating resistor of a thermal head.

8 Claims, 2 Drawing Sheets

RESISTOR, PROCESS FOR PRODUCING THE SAME, AND THERMAL HEAD USING THE SAME

BACKGROUND OF THE INVENTION

The present invention relates to a resistor for use in hybrid ICs and various other electronic devices. The present invention also relates to a process for producing the resistor and a thermal head using the resistor. In particular, the present invention relates to a thin uniform resistor that contains iridium (Ir) and which can be produced by a thick-film process, and also relates to a process for producing the resistor, as well as to a thermal head using it.

There have been two basic approaches for fabricating resistors useful in electronic devices such as hybrid ICs and thermal heads; one is a thick-film process in which a coating of thick-film resistive paste is formed on a substrate which is then fired to make a resistor, and the other method is a thin-film process employing sputtering or other thin-film depositing techniques.

In a thick-film process, a powder mixture of ruthenium oxide and glass frit is dispersed in an organic vehicle made of a solvent and a resin and the resulting thick-film resistive paste is screen-printed on a substrate, which is then fired to make a resistor.

In a thin-film process which employs vacuum technology, a thin film of a refractory metal such as tantalum is deposited on a substrate by sputtering and a patterned thin-film resistor is fabricated by photolithographic techniques. This method is used to fabricate some of the thermal heads in current use.

The conventional thick-film process which uses thick-film resistive paste have the advantage of achieving high production rate with inexpensive facilities. However, on account of their large thickness ($\geq 10$ $\mu$m) and because of the inhomogeneity of the thick-film paste which is made of glass frit and ruthenium oxide powder, the resistors produced by this process have the problem of low strength to an electric field, i.e. their resistance changes sharply when they are subjected to voltage variations.

Further, the thick-film process has additional disadvantages; the value of resistance of the final product cannot be effectively controlled by adjusting the proportions of glass frit and ruthenium oxide alone and great variations in resistance will occur not only because of the difference in the particle sizes of glass frit and ruthenium oxide powder but also depending upon the firing temperature used. Even if the same compositional range and average particle size are used, the value of resistance will differ from one lot to another.

The thin-film process is capable of producing uniformly thin film resistors but, on the other hand, this method requires expensive facilities and achieves only a low production rate.

SUMMARY OF THE INVENTION

The present invention has been accomplished in order to solve the aforementioned problems of the prior art. An object, therefore, of the present invention is to realize the production of a thin uniform film resistor by a thick-film process.

Another object of the present invention is to provide a thermal head that employs the above-described resistor to achieve improvement in image quality.

These objects of the present invention can be attained by a resistor containing iridium (Ir) as a resistive material. The resistor of the present invention may further contain at least one metal (M) selected from the group consisting of silicon (Si), bismuth (Bi), lead (Pb), tin (Sn), aluminum (Al), boron (B), titanium (Ti), zirconium (Zr), barium (Ba) and calcium (Ca). Preferably, these metals and iridium are incorporated in such amounts that the ratio of the number of metal (M) atoms to that of iridium (Ir) atoms is in the range of 0.5–2.7.

According to the process of the present invention, a solution of a metal organic compound that contains iridium (Ir) and optionally other metals (M) is coated on a substrate, which is subsequently dried and fired at a peak temperature of not lower than 500° C. to make a heating resistor. As used herein, the terms "metal organic compound" and "organometallic compound" may be used interchangeably.

The resulting resistor contains iridium oxide (IrO$_2$). If it is prepared from a solution of metal organic compound containing other metals (M), it has a homoegeneous structure containing oxides of those metals and ternary oxides of them and iridium. The proportions of iridium oxide, oxides of other metals (M) and ternary oxides of them and iridium can be controlled by adjusting the kind of solution of a metal organic compound used and the firing temperature employed, and this enables adjustments in the value of the resistance of the final device.

In still another aspect of the present invention, a thermal head is fabricated by using the heating resistor described above.

DETAILED DESCRIPTION OF THE PREFERRED EMBODIMENTS

Embodiments of the present invention will be described with reference to the accompanying drawings.

EXAMPLE 1

"Metal Resinate" (trade name of Engelhard Minerals & Chemicals Corporation) of the following identification numbers were used as solutions of metal organic compounds.

Ir . . . A-1123,
Si . . . #28-FC,
Bi . . . #8365,
Pb . . . #207-A,
Sn . . . #118B,
Al . . . A3808,
B . . . #11-A,
Ti . . . #9428,
Zr . . . #5437,
Ca . . . 40B,
Ba . . . #137-C.

These solutions were mixed in such proportions that the ratio of the numbers of Ir, Bi and Si atoms in the mixture after firing would be 1:1:1. The viscosity of the mixture was adjusted to 5,000–30,000 CPS by using a suitable solvent such as α-terpineol, Butyl Carbitol, or an acetate.

The resulting mixture was printed on a glazed alumina substrate (i.e., alumina coated with glass) by using a stainless steel screen of 100–400 mesh. After drying at 120° C., the coated substrate was fired in an Ir belt furnace for 10 minutes at a peak temperature of 800° C. to form a resistor film on the substrate.

The resistor film had a thickness of 0.1–0.5 μm and a sheet resistance of 150Ω/□ as calculated for a film thickness of 0.2 μm.

In addition to this heating resistor (I), a heating resistor (I') that was formed by firing, at a peak temperature of 800° C., a coating prepared from a mixture having an Ir:Si:Pb atomic ratio of 1:1:0.5 and a conventional ruthenium oxide based thick-film resistor (II) were subjected to strength measurements by a step stress test (SST). The results are shown in FIG. 1, in which the horizontal axis plots power wattage (W) and the vertical axis, resistance variance (%).

Strength measurements by SST are well known and involve investigation of resistance variance in response to changes in electrical power. In the test, the results of which are shown in FIG. 1, 1-ms wide pulses were applied with their height changed for every 10 ms to change the applied voltage, and the resulting change in resistance was measured.

Heating resistors (I) and (I') measured 105 μm×150 μm and had a film thickness of 0.20 μm. The values of their resistance were 1,037Ω and 2,232Ω, respectively. Conventional thick-film resistor (II) measured the same size but its film thickness was 15 μm.

Figure 1:
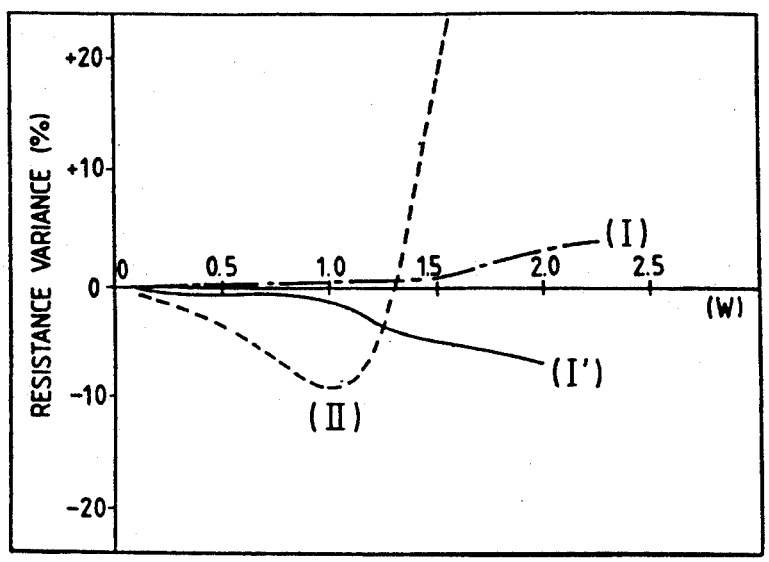
FIG. 1 shows the results of strength measurements conducted by a step stress test on resistor samples of the present invention and a prior art resistor.

As is clear from FIG. 1, the two samples of heating resistor fabricated in accordance with the present invention experienced very small changes in resistance in spite of power variations and the changes were negligible at powers in the neighborhood of commonly used 1 watt. In other words, these resistors had remarkably increased strength and hence improved device reliability.

Additional resistor samples were fabricated by using different compositions and the values of their sheet resistance are shown in Table 1 below. All samples had a film thickness of 0.20 μm.

TABLE 1

| Sample | Composition (ratio in number of atoms) | Sheet resistance (Ω/□) |
|---|---|---|
| A | Ir:Si:Bi = 1:0.3:0.2 | 189 |
| B | Ir:Si:Pb = 1:1:0.5 | 330 |
| C | Ir:Si:Sn = 1:0.5:0.3 | 993 |
| D | Ir:Si:Bi:Al = 1:1:1:0.7 | 399 |
| E | Ir:Si:Bi:Ti = 1:1:1:0.3 | 302 |
| F | Ir:Si:Bi:Pb = 1:1:1:0.5 | 299 |
| G | Ir:Si:Bi:Zr = 1:1:1:0.3 | 276 |
| H | Ir:Si:Bi:Ca = 1:1:1:0.1 | 186 |
| I | Ir:Si:Pb:Ca = 1:0.5:0.5:0.2 | 751 |
| J | Ir:Si:Pb:Ba = 1:1:1:0.1 | 529 |
| K | Ir:Si:Pb:Al = 1:0.5:0.5:0.1 | 485 |
| L | Ir:Si:Pb:B = 1:0.5:0.5:0.2 | 447 |
| M | Ir:Si:Pb:Ti = 1:0.5:0.5:0.3 | 412 |
| N | Ir:Si:Pb:Zr = 1:0.5:0.5:0.1 | 464 |
| O | Ir:Si:Sn:Al = 1:0.3:0.5:0.1 | 1684 |

In Example 1, the ratio of the number of bismuth (Bi) and silicon (Si) atoms to that of iridium (Ir) atoms, i.e., the value of M/Ir, was 2 but it should be understood that this is not the only case that can be adopted in the present invention and various other compositions as shown in Table 1 can be used. However, if the atomic ratio of at least one metal (M) selected from the group specified herein (M should be taken to cover the case where two or more additional elements are incorporated) to iridium (Ir) in the fired film is less than 0.5, a resistor film that strongly adheres to the substrate is not obtained. If M/Ir exceeds 2.7, agglomeration occurs and discrete islands rather than a film will form. Therefore, M/Ir should be selected from the range of 0.5–2.7.

Figure 2:
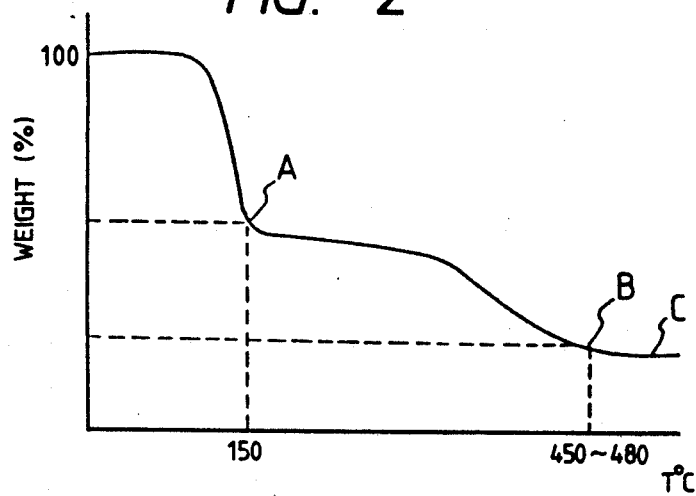
FIG. 2 is a view showing the relation between temperature and weight of resistive paste.

In the process of the present invention, the coated substrate is fired at a peak temperature of not lower than 500° C. If the firing temperature is below 500° C., great difficulty is involved in forming a desired resistor film. This is evident from the results of thermogravimetric analysis of resistive paste shown in FIG. 2. According to FIG. 2, the decrease in weight at a firing temperature in the neighborhood of 150° C. (at point A) is assumed to have occurred on account of solvent evaporation; the decrease in weight at a temperature of about 450°–480° C. (at point B) would be due to the combustion of organic matter; and above a temperature of about 500° C. (at point C), the organometallic materials in the mixture would have been completely oxidized to form a desired resistor. The possible oxides include $IrO_2$, $SiO_2$, CaO, BaO, $Al_2O_3$, $B_2O_3$ and PbO, as well as ternary oxides including $BaIrO_3$, $Pb_2IrO_{7-x}$ and $Bi_2Ir_2O_7$, and mixtures of these oxides are believed to be present in the final resistor.

In Example 1, various types of "Metal Resinate" available from Engelhard Minerals & Chemicals Corporation were used as solutions of metal organic compound. It should, however, be understood that the scope of the present invention is by no means limited to these solutions and various other types of solutions of organometallic material can be employed that are prepared from those complexes of iridium or other metals with organic materials such as carboxylic acids, which are soluble in organic solvents such as α-terpineol, Butyl Carbitol and acetates. Suitable metal complexes are listed below:

As Ir complex:

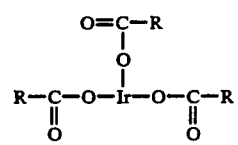

As Al complex:

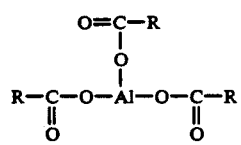

As B complex:

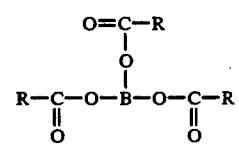

-continued

As Ti complex:

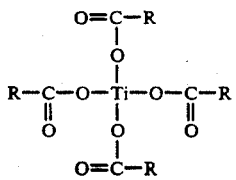

As Zr complex:

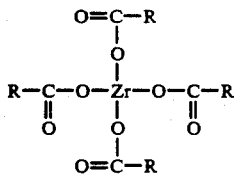

As Ca complex:

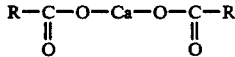

As Sn complex:

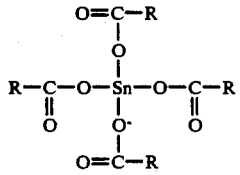

In Example 1, the resistive paste was coated on the substrate by screen printing but the present invention permits the use of other coating methods commonly employed in a thick-film process, such as spin coating, roll coating and dip coating. After the resistive paste is applied to the entire surface of the substrate by these methods, the coating is fired and patterned by etching to make a resistor of a desired shape.

EXAMPLE 2

This example shows the use of the heating resistor of Example 1 in a thermal head.

Figure 3:
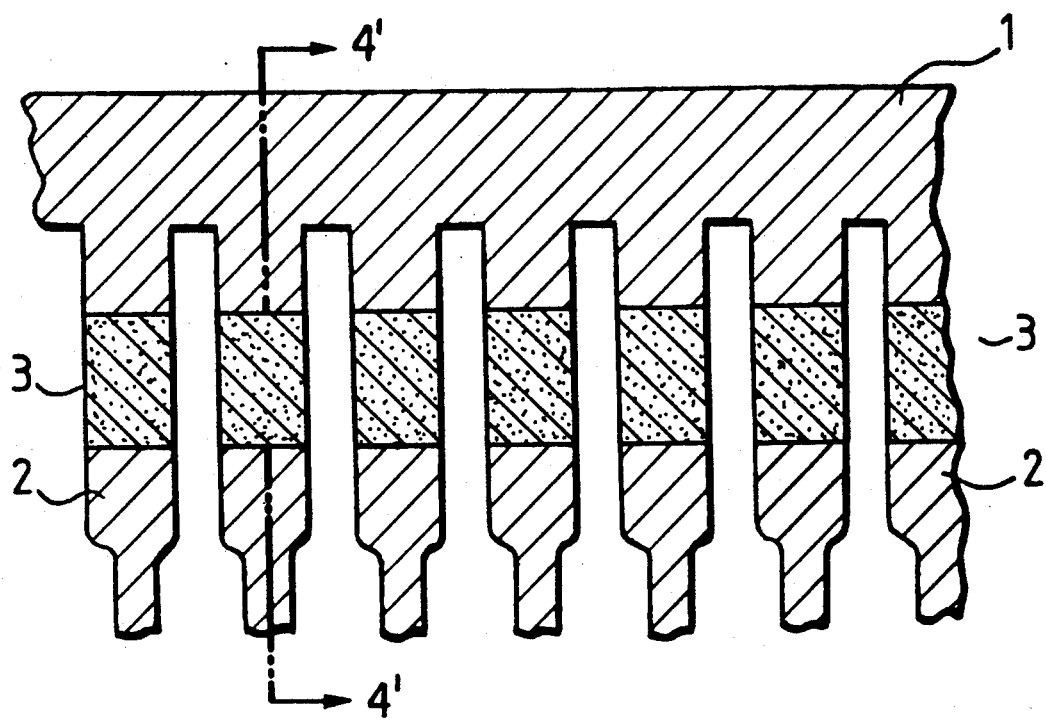
FIG. 3 is a plan view showing the essential part of a thermal head according to an embodiment of the present invention.
Figure 4:
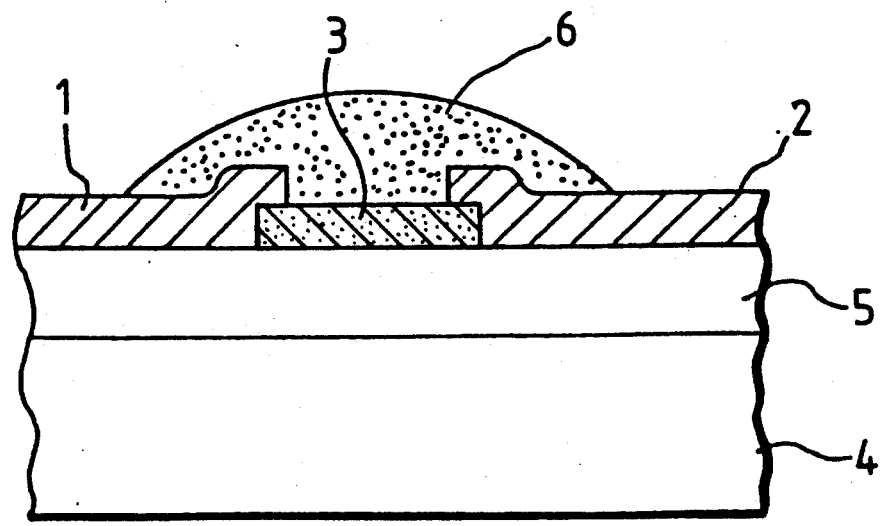
FIG. 4 is a cross section of FIG. 3 taken along line 4'-4'.

FIG. 3 is a plan view of the essential part of a thermal head, and FIG. 4 is a cross section of FIG. 3 taken along line 41—41. In FIG. 3 and 4, reference numeral 1 denotes a common electrode; reference numeral 2 denotes a counter electrode; reference numeral 3 denotes a heating resistor; reference numeral 4 an alumina substrate; reference numeral 5 denotes an undercoat of glaze; and reference numeral 6 denotes an overcoat of glaze.

The thermal head shown in FIGS. 3 and 4 was fabricated by the following procedures. First, a resistor film serving as heating resistor 3 was formed on the glazed alumina substrate (alumina substrate 4 having undercoat of glaze 5 formed thereon) by the method described in Example 1. Then, a resist pattern for resistor was formed by resist coating, exposure and development. Using fluoronitric acid as a liquid etchant, the resistor was etched to produce a resistor pattern comprising 8-24 dots per millimeter.

Subsequently, Metalloorganic Gold Paste D27 of Noritake Co., Limited was printed on the entire surface of the resistor and fired to form a gold film. A resist pattern for conductor in common electrode 1 and counter electrode 2 was then formed by resist coating, exposure and development. Using a solution of iodine and potassium iodide ($I_2 \cdot KI$) as a liquid etchant, the gold film was etched to produce a conductor pattern.

Glass Paste 490 BH of Electro Science Laboratory (ESL) Co., Ltd. was printed on selected parts of the electrodes as a protective layer and fired to form an overcoat of glaze 6. These steps complete the fabrication of a thermal head.

Figure 5:
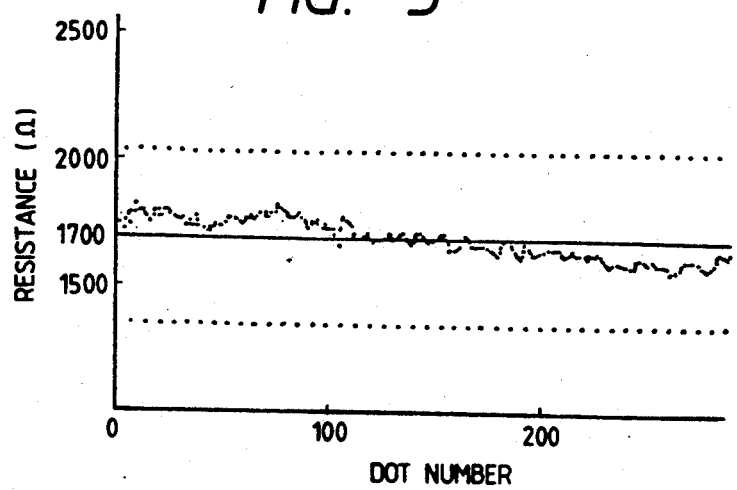
FIG. 5 is a resistance characteristic diagram of the thermal head shown in FIGS. 3 and 4.

This thermal head had the resistance characteristics shown in FIG. 5, in which the horizontal axis plots the number of dots and the vertical axis plots the value of resistance ($\Omega$). The resistor used in this thermal head was made of a composition having Ir:Si:Bi:Zr in an atomic ratio of 1:1:1:0.3 and consisted of 12 dots per millimeter. As is clear from FIG. 5, the relative standard deviation 6 of the resistance of the tested thermal head was only 3.9% and it experienced very small variations in resistance due to power changes. Discrete heating resistors arranged in a face-to-face relationship have been difficult to fabricate by the conventional thick-film process but the present invention enables easy production of such resistors by employing an etching technique so that adjacent heads composed of them are capable of producing image of improved quality on account of reduced thermal leakage.

As described above, the resistor of the present invention has the following advantages.

(1) It can be fabricated as a uniform thin film although the production apparatus is no more expensive than that employed in the manufacture of conventional glass frit based thick film resistors.

(2) The value of resistance presented by this resistor is substantially determined by the proportions of metals used and the firing temperature employed and there is no need to take into account the effects of other parameters including lot-dependent variations.

(3) This resistor experiences smaller power-dependent variations in resistance than prior art thick-film resistors and hence features a higher reliability.

(4) Combining the advantages of a thick-film resistor with those of a thin-film resistor, the resistor of the present invention exhibits high strength against power and enables the fabrication of a sublimation type thermal head or other thermal recording heads that consume large electric power.

(5) Because of the uniformity of resistor film, an etching technique can be adopted to produce a resistor of a desired shape. In Example 2 described above, a resistor composed of 24 fine lines per millimeter could be produced.

(6) A thermal head using the resistor of the present invention is capable of producing image of improved quality.

What is claimed is:

1. A process for producing a resistor, comprising:
    (a) coating a substrate with a solution of an iridium-containing organometallic compound in a solvent; and
    (b) firing the resulting coated substrate to form said resistor.

2. The process of claim 1, wherein said solution further contains at least one other organometallic compound containing a metal selected from the group consisting of silicon, bismuth, lead, tin, aluminum, boron, titanium, zirconium, calcium, barium and mixtures thereof.

3. The process of claim 2, wherein the atomic ratio of the number of atoms of metal in said other organometallic compound to the number of iridium atoms in said iridium-containing organometallic compound is in the range of 0.5 to 2.7.

4. The process of claim 1, wherein said firing is conducted at a peak temperature not lower than 500° C.

5. A resistor made according to the process of claim 1.

6. A thermal head comprising an alumina substrate, an underglaze layer formed on said substrate, a counter electrode formed on a first portion of said underglaze layer, a common electrode formed on a second portion of said underglaze layer, a heating resistor formed on said underglaze layer between said electrodes and an overglaze layer formed on at least said resistor, wherein said resistor is formed by coating said substrate with a solution of an iridium-containing organometallic compound in a solvent and subsequently firing the resulting coated substrate at a temperature of not lower than 500° C.

7. The thermal head of claim 6, wherein said solution further contains at least one other organometallic compound containing a metal selected from the group consisting of silicon, bismuth, lead, tin, aluminum, boron, titanium, zirconium, calcium, barium and mixtures thereof.

8. The thermal head of claim 7, wherein the atomic ratio of the number of atoms of metal in said other organometallic compound to the number of iridium atoms in said iridium-containing organometallic compounds is in the range of 0.5 to 2.7.

* * * * *